US010728091B2

(12) United States Patent
Zhao et al.

(10) Patent No.: US 10,728,091 B2
(45) Date of Patent: Jul. 28, 2020

(54) TOPOLOGY-AWARE PROVISIONING OF HARDWARE ACCELERATOR RESOURCES IN A DISTRIBUTED ENVIRONMENT

(71) Applicant: EMC IP Holding Company LLC, Hopkinton, MA (US)

(72) Inventors: Junping Zhao, Beijing (CN); Yunfan Han, Austin, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 178 days.

(21) Appl. No.: 15/945,412

(22) Filed: Apr. 4, 2018

(65) Prior Publication Data
US 2019/0312772 A1 Oct. 10, 2019

(51) Int. Cl.
*H04L 12/24* (2006.01)
*G06N 3/08* (2006.01)
(Continued)

(52) U.S. Cl.
CPC ........ *H04L 41/0806* (2013.01); *G06F 9/5011* (2013.01); *G06N 3/08* (2013.01);
(Continued)

(58) Field of Classification Search
CPC .... G06F 9/5011; G06F 9/5044; G06F 9/5072; G06N 3/08; G06N 3/084; H04L 41/12;
(Continued)

(56) References Cited

U.S. PATENT DOCUMENTS

| 2016/0323161 A1* | 11/2016 | Cuervo Laffaye | .... G06F 9/5044 |
| 2017/0293994 A1* | 10/2017 | Li | .............................. G06T 1/20 |
| 2018/0357534 A1* | 12/2018 | Cho | ........................ G06N 3/084 |

OTHER PUBLICATIONS

Leo Zou, "Bringing HPC Techniques to Deep Learning," http://research.baidu.com/bringing-hpc-techniques-deep-learning/, Feb. 21, 2017, 16 pages.

(Continued)

*Primary Examiner* — Clayton R Williams
*Assistant Examiner* — Michael Li
(74) *Attorney, Agent, or Firm* — Ryan, Mason & Lewis, LLP

(57) ABSTRACT

Techniques are provided for topology-aware provisioning of computing resources in a distributed heterogeneous environment. For example, a method includes: receiving a service request from a client system to perform a data processing job in a server cluster; determining candidate accelerator devices that reside in server nodes of the server cluster, which can be utilized to perform the data processing job; determining a connection topology of each candidate accelerator device within the server nodes, and a performance ranking of each connection topology; utilizing the determined performance ranking of each connection topology to select a group of accelerator devices among the candidate accelerator devices, which can be provisioned to perform the data processing job, wherein the selected group of accelerator devices include candidate accelerator devices with connection topologies that have matching performance rankings; and scheduling and provisioning the selected group of accelerator devices to execute the data processing job.

20 Claims, 8 Drawing Sheets

(51) Int. Cl.
*G06F 9/50* (2006.01)
*H04L 29/08* (2006.01)

(52) U.S. Cl.
CPC .............. *H04L 41/12* (2013.01); *H04L 41/14* (2013.01); *H04L 67/10* (2013.01)

(58) Field of Classification Search
CPC ..... H04L 41/14; H04L 41/0806; H04L 67/10; H04L 67/1002
See application file for complete search history.

(56) References Cited

OTHER PUBLICATIONS

U.S. Appl. No. 15/669,452 filed in the name of Junping Zhao et al. filed Aug. 4, 2017 and entitled "Topology Aware Grouping and Provisioning of GPU Resources in GPU-as-a-Service Platform."

* cited by examiner

| INTRA-NODE CONNECTION TYPE | RANK SCORE | DESCRIPTION |
|---|---|---|
| NVLINK | 10 | GPU Interconnect Path includes NVLINK |
| PIX | 5 | GPU Interconnect Path includes Internal PCIe Switch |
| PXB | 4 | GPU Interconnect Path includes Multiple Internal PCIe Switches |
| PHB | 3 | GPU Interconnect Path includes PCIe Host Bridge |
| SOC | 1 | GPU Interconnect Path includes Socket Level Link (e.g., QPI) |

FIG. 5B
510

| NETWORK CONNECTION TYPE | RANK SCORE | DESCRIPTION |
|---|---|---|
| 100GbE | 10 | 100 Gigabit Ethernet - Ethernet frames transmitted at rate of 100 gigabits per second (Gbit/s) |
| 40GbE | 5 | 40 Gigabit Ethernet - Ethernet frames transmitted at rate of 40 Gbit/s |
| 25GbE | 3 | 25 Gigabit Ethernet - Ethernet frames transmitted at rate of 25 Gbit/s |
| 10GbE | 2 | 10 Gigabit Ethernet - Ethernet frames transmitted at rate of 10 Gbit/s |
| RDMA-Enabled | If Yes, then 2X Score | RDMA over Converged Ethernet (RoCE) Network Protocol allows Remote Direct Memory Access (RDMA) over Ethernet Network Connection |

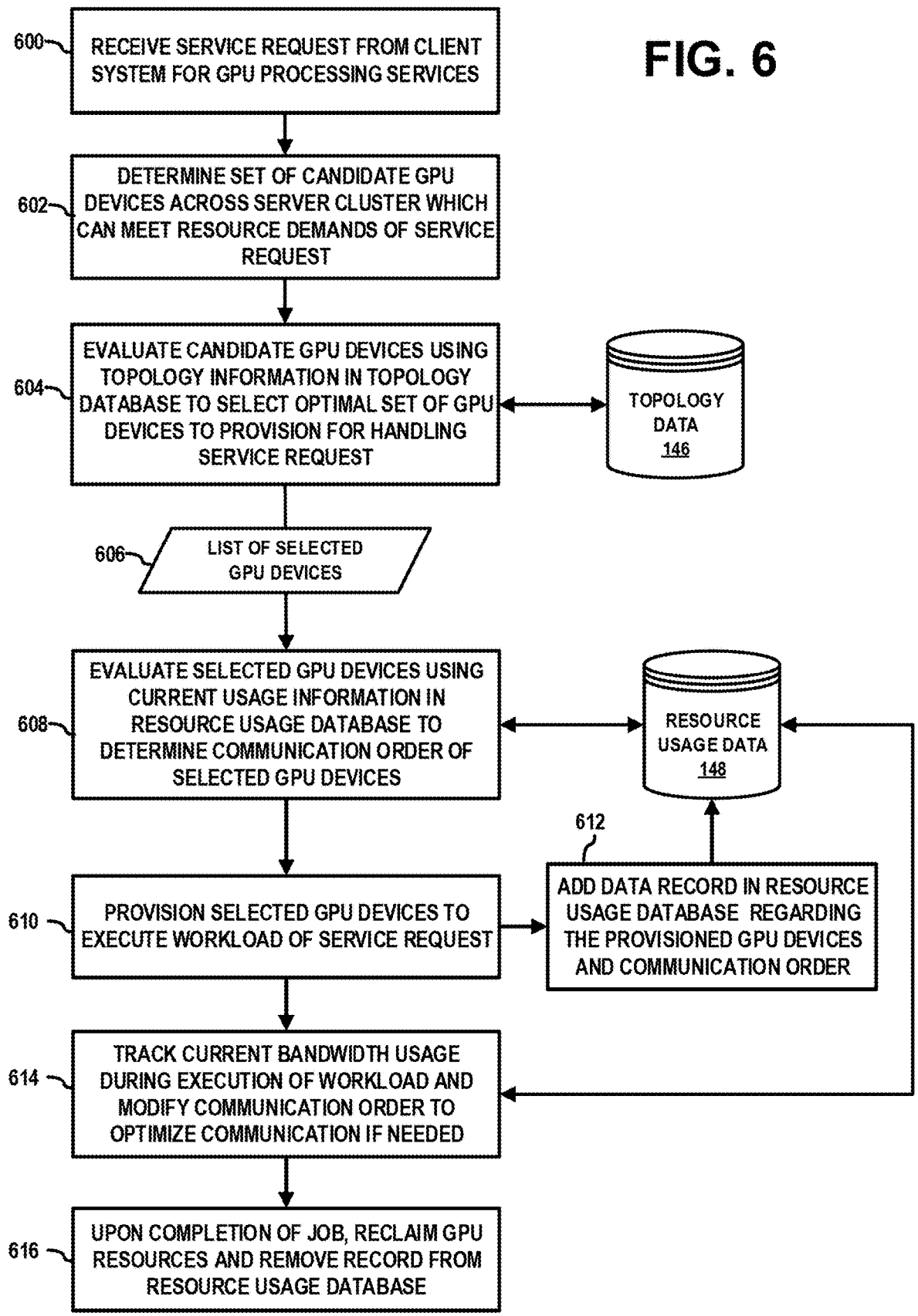

TOPOLOGY-AWARE PROVISIONING OF HARDWARE ACCELERATOR RESOURCES IN A DISTRIBUTED ENVIRONMENT

FIELD

This disclosure relates generally to techniques for managing and provisioning computing resources in a distributed computing system.

BACKGROUND

Various types of special-purpose processors, such as graphics processing units (GPUs) for general purpose computing and other types of hardware accelerators, have been developed for accelerated processing of specific types of workloads. The processing capabilities of GPU devices and other types of hardware accelerators are currently being utilized in various applications to accelerate the processing of highly-parallelized computational workloads in various technical fields. In particular, general-purpose computing on GPU (GPGPU) is utilized for high-throughput, accelerated processing of compute kernels for workloads (e.g., vector-based computations, matrix-based computations, etc.) that exhibit data-parallelism. For example, GPUs are used to accelerate data processing in high-performance computing (HPC) and embedded computing systems, for various applications such as financial modeling, scientific research, machine learning (ML), deep learning (DL), data mining, video data transcoding, image analysis, image recognition, virus pattern matching, augmented reality, encryption/decryption, weather forecasting, big data analytics and comparisons, and other applications with computational workloads that have an inherently parallel nature.

A distributed computing environment which comprises a large scale of shared computing resources over a cluster of computing nodes is typically utilized to support emerging applications such as big data analytics and deep learning applications. Indeed, deep learning applications, for example, require the collection, storage, and processing of a significantly large amount of data, wherein the data includes training data to build and optimize deep learning models, as well as model parameters of the deep learning models which are utilized for inference processing. Implementing an efficient distributed computing environment for these types of applications is not trivial as the intensive computational workloads, and the massive volume of data that must be stored, streamed, prefetched, and coordinated between the shared computing resources of the distributed computing platform presents a significant challenge and practical limit on system performance and scalability.

SUMMARY

Illustrative embodiments of the invention include methods to provide topology-aware provisioning of computing resources in a distributed heterogeneous computing environment. For example, one embodiment includes a method which comprises: receiving, by a control server node, a service request from a client system to perform a data processing job in a server cluster managed by the control server node; determining, by the control server node, candidate accelerator devices that reside in one or more server nodes of the server cluster, which can be utilized to perform the data processing job; determining, by the control server node, a connection topology of each candidate accelerator device within the one or more server nodes, and a performance ranking of each connection topology; utilizing, by the control server node, the determined performance ranking of each connection topology to select a group of accelerator devices among the candidate accelerator devices, which can be provisioned to perform the data processing job, wherein the selected group of accelerator devices include candidate accelerator devices with connection topologies that have matching performance rankings; and scheduling and provisioning the selected group of accelerator devices to execute the data processing job.

Other embodiments of the invention include, without limitation, systems and articles of manufacture comprising processor-readable storage media for topology-aware provisioning of computing resources in a distributed heterogeneous computing environment.

BRIEF DESCRIPTION OF THE DRAWINGS

FIG. 5A illustrates a data structure which comprises configurable performance ranking scores for different types of intra-node connection topologies of a GPU server node, according to an embodiment of the invention.

FIG. 5B illustrates a data structure which comprises configurable performance ranking scores for different types of inter-node connection topologies, according to an embodiment of the invention.

FIG. 6 is a flow diagram of a method to provide topology-aware provisioning of computing resources in a distributed heterogeneous computing environment, according to an embodiment of the invention.

DETAILED DESCRIPTION

Illustrative embodiments of the invention will now be explained in further detail with regard to systems and methods to provide topology-aware provisioning of computing resources (e.g., hardware accelerator resources such as GPU device) in a distributed heterogeneous computing environment. As explained in further detail below, systems and methods for dynamically scheduling and provisioning computing resources in a heterogeneous server cluster are configured to maintain information regarding the hardware connection topology of server nodes within a heterogeneous cluster, as well as current bandwidth usage information regarding intra-node and inter-node communication links of the server nodes, and utilize such information to provision computing devices (e.g., GPUs) in a way that optimizes communication bus and networking resources (mitigates or eliminates waste of network resources), and which optimally utilizes bidirectional connection topologies, in a balanced manner, to mitigate communication bottlenecks between computing resources. In one exemplary embodiment, systems and methods are configured to implement dynamic topology-aware provisioning of GPU devices in a logical communication ring using a "Ring-AllReduce" protocol to execute HPC workloads such as DL training.

Figure 1:
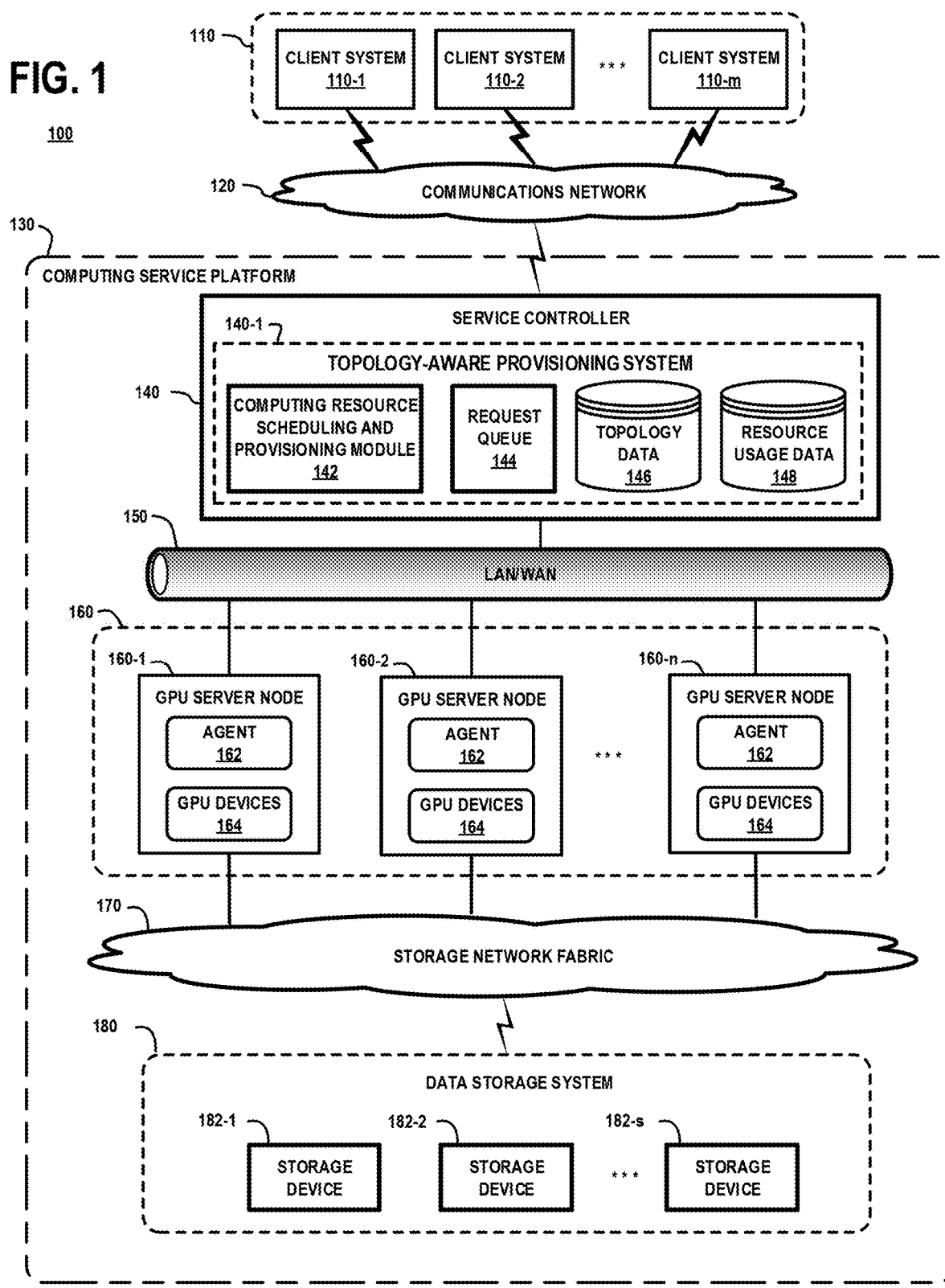
FIG. 1 is a high-level schematic illustration of a system which comprises a computing service platform that is configured to provide topology-aware provisioning of computing resources in a distributed heterogeneous computing environment, according to an embodiment of the invention.

FIG. 1 is a high-level schematic illustration of a system 100 which comprises a computing service platform that is configured to provide topology-aware provisioning of computing resources in a distributed heterogeneous computing environment, according to an embodiment of the invention. The system 100 comprises a plurality (m) of client systems 110-1, 110-2, ..., 110-m (collectively referred to as client systems 110), a communications network 120, and a computing service platform 130 which can be accessed by the client systems 110 over the communications network 120. The computing service platform 130 comprises a service controller 140 (e.g., a control server node), a service platform network 150, a server cluster 160 (e.g., server farm) comprising a plurality (n) of GPU server nodes 160-1, 160-2, ..., 160-n, a storage network fabric 170, and a data storage system 180 comprising a plurality (s) of data storage devices 182-1, 182-2, ..., 182-s. The service controller 140 implements a topology-aware provisioning system 140-1 which comprises a computing resource scheduling and provisioning module 142, a request queue 144, a topology database 146, and a resource usage database 148 (or usage database). The GPU server nodes 160-1, 160-2, ..., 160-n comprise reporting agents 162 and GPU devices 164 (as well as other possible computing resources including, but not limited to, central processing units (CPUs), field programmable gate array (FPGA) devices, application specific integrated circuit (ASIC) devices, tensor processing units (TPUs), image processing units (IPUs), etc.). The server cluster 160 comprises a heterogeneous cluster of GPU server nodes which can have different hardware and network connection topologies/configurations, examples of which will be explained below with reference to FIGS. 3A through 3E.

The client systems 110 comprise various types of computing devices such as desktop computers, laptop computers, electronic tablets, etc. In another embodiment, the client systems 110 may comprise servers in a data center which require GPU processing services. The communications network 120 is configured to enable network communication between the client systems 110 and the service platform 130. While the communications network 120 is generically depicted in FIG. 1, it is to be understood that the communications network 120 may comprise any known communication network such as, a global computer network (e.g., the Internet), a wide area network (WAN), a local area network (LAN), a satellite network, a telephone or cable network, a cellular network, a wireless network such as Wi-Fi or WiMAX, or various portions or combinations of these and other types of networks. The term "network" as used herein is therefore intended to be broadly construed so as to encompass a wide variety of different network arrangements, including combinations of multiple networks possibly of different types. In this regard, the network 120 in some embodiments comprises combinations of multiple different types of communications networks each comprising network devices configured to communicate using Internet Protocol (IP) or other related communication protocols. The network 120 comprises intermediate points (such as routers, switches, etc.) and other elements that form a network backbone to establish communication paths and enable communication between network endpoints.

The service platform network 150 is configured to enable inter-node communication between the service controller 140 and the GPU server nodes 160-1, 160-2, ..., 160-n of the server cluster 160, as well as to enable peer-to-peer network communication between the GPU server nodes 160-1, 160-2, ..., 160-n within the server cluster 160. Depending on the network distribution and geographic location of the constituent components and nodes of the computing service platform 130, the service platform network 150 may comprise, for example, a LAN, a WAN, or a combination of one or more LANs and WANs, as well as other types of communications networks that are commonly used to implement cloud computing platforms. The storage network fabric 170 can be implemented using any suitable networking system and protocol to enable shared access to the data storage system 180 by the GPU server nodes 160-1, 160-2, ..., 160-n of the server cluster 160. In one embodiment, the service platform network 150 and the storage network fabric can be integrated into a converged framework such as a converged Ethernet framework using known techniques.

The data storage system 180 can be implemented using any suitable data storage system, or combination of data storage systems, including, but not limited to storage area network (SAN) systems, direct attached storage (DAS) systems, Hadoop Distributed File System (HDFS), a serial attached storage (SAS/SATA) system, as well as other types of data storage systems comprising clustered or distributed virtual and/or physical infrastructure. The data storage devices 182-1, 182-2, ..., 182-s comprise non-volatile storage media to provide persistent storage resources for the GPU server nodes 160-1, 160-2, ..., 160-n of the server cluster 160 (e.g., to store training data used for deep learning applications). The data storage devices 182-1, 182-2, ..., 182-s may include one or more different types of persistent storage devices, or data storage arrays, such as hard disk drives (HDDs) or solid-state drives (SSDs), or other types and combinations of non-volatile memory. In one embodiment, the data storage devices 182-1, 182-2, ..., 182-s are implemented using, for example, an enterprise-class storage platform comprising high performance, scalable storage arrays, which can be implemented for hyper-scale computing systems.

Furthermore, the GPU server cluster 160 can be implemented as part of a private or public computing platform (e.g., a data center, a cloud computing system, etc.) to provide GPU processing services for HPC applications such as deep learning applications, and other machine learning applications. Furthermore, the GPU server nodes 160-1, 160-2, ..., 160-n of the server cluster 160 may implement one of many types of commercially available server systems including, but not limited to, a Windows server, a Sun Solaris server, an HP server, a Linux server, etc. The GPU sever cluster 160 can be a constituent component of a data center or cloud computing platform that performs data computing and data storage functions to support one or more network applications and/or on-line services that deliver consumer or business applications and services to multiple end users, service providers, and/or organizations. In one embodiment, the computing service platform 130 comprises a Deep Learning-as-a-Service (DLaaS) platform, wherein one or more of the GPU server nodes 160-1, 160-2, . . . , 160-$n$ hosts a deep learning application to support a DLaaS service that can be utilized by the client systems 110.

The service controller 140 is configured to control and manage various functionalities of the computing service platform 130. For example, the service controller 140 receives service requests from the client systems 110 for executing HPC jobs on the server cluster 160 (e.g., distributed DL training, or other HPC jobs), and the received service requests are stored in the request queue 144. The service controller 140 utilizes the topology-aware provisioning system 140-1 to schedule and provision computing resources for jobs pending in the request queue 144. A service request can include various user-specified conditions and demands for executing a given job (e.g., DL training) associated with the service request. For example, a service request may specify (i) a desired number (N) of accelerator devices (e.g., GPU devices) to provision for the requested job, (ii) a specific type/model of accelerator device (e.g., NVidia P100 GPU, Tensor flow TPU, etc.) to be utilized for the requested job, (iii) whether the provisioned accelerator devices should be exclusively allocated for the requested job or can be shared with other jobs, and/or (iv) other conditions based on a service level agreement (SLA) with the given client. In addition, the provisioning of accelerator resources for pending jobs can be based on predefined policies of the service provider for handing specific types of jobs. The service request and associated provisioning specifications are stored in the request queue 144 pending scheduling by the computing resource scheduling and provisioning module 142.

In one embodiment, the computing resource scheduling and provisioning module 142 implements methods to perform a topology-aware resource provisioning process (e.g., FIG. 6) which dynamically schedules and provisions hardware accelerator resources (e.g., GPU resources) for pending jobs over one or more of the GPU server nodes 160-1, 160-2, . . . , 160-$n$ in the GPU server cluster 160 to execute HPC workloads associated with service requests received from the client systems 110. The computing resource scheduling and provisioning module 142 will allocate either a single GPU server node or multiple GPU server nodes within the cluster of GPU server nodes 160 to handle a given service request depending on, e.g., the available GPU devices and processing resources of the GPU server nodes, the nature of the GPU processing tasks associated with the service request, and other factors as discussed below.

Depending on user-specified policies and/or predefined service provider policies, different client systems 100 can share GPU devices 164 of a given GPU server node temporally and/or spatially. For example, in one embodiment, a single GPU device can be shared temporally by different client systems, wherein different GPU processing tasks associated with the different client systems are executed using the same GPU device at different times. In another embodiment, a single GPU device can be shared spatially, wherein different GPU processing tasks of different client system are concurrently executed using the same GPU device, but executed in different sets of cores of the GPU device, for example.

In a typical computing environment, the sever cluster 160 will be a heterogeneous computing cluster wherein the constituent GPU server nodes 160-1, 160-2, . . . , 160-$n$ can be implemented using a wide range of different topologies, wherein the term "topology" as used herein broadly refers to the hardware configuration and intra-node connections of hardware elements of a given server node, as well as the network interface elements to support inter-node connections between server nodes within the cluster 160. The computing resource scheduling and provisioning module 142 implements a dynamic "topology aware" and "bandwidth usage aware" computing resource provisioning method, which utilizes information in the topology database 146 and the resource usage database 148 to dynamically schedule and provision computing resources (e.g., GPU devices 164) within the heterogeneous server cluster 160 for executing pending jobs.

In particular, the computing resource scheduling and provisioning module 142 utilizes information regarding (i) the topology of server nodes within the heterogeneous cluster 160, and (ii) current bandwidth usage information regarding intra-node and inter-node communication links of the server nodes, to provision accelerator devices (e.g., GPUs) for a given job in a way that optimizes communication bus and networking resources (mitigates or eliminates waste of network resources), and which optimally utilizes bidirectional connection topologies, in a balanced manner, to mitigate communication bottlenecks between the provisioned accelerator devices. For example, in one exemplary embodiment as discussed in further detail below, the computing resource scheduling and provisioning module 142 implements a dynamic "topology aware" and "bandwidth usage aware" computing resource provisioning method to efficiently provision a group of computing resources (e.g., GPU devices) in a specific configuration (e.g., Ring-AllReduce communication configuration) to execute a HPC computing job (e.g., DL training) in an optimal manner.

The topology database 146 comprises a centralized datastore to maintain cluster wide topology information which is reported from the various reporting agents 162. For example, the topology database 146 can include information regarding the current topology of each active server in the server cluster 160. The topology information for a given server node will indicate the types and number of hardware processor resources (e.g., CPUs, GPUs, other accelerator devices) of the given server node. In addition, the topology information will indicate the types of intra-node connection topologies (communication links) used to connect the hardware processor resources of a given server node. For example, the intra-node connection topologies of a given server node can be implemented using various communication protocols such as a Remote Direct Memory Access (RDMA) protocols, an InfiniBand (IB) protocol, a Peripheral Component Interconnect Express (PCIe) protocol, a NVIDIA® NVLink™ protocol, NVIDIA GPUDirect, and other point-to-point serial interconnect protocols that enable, e.g., CPU-GPU and GPU-GPU communication. Furthermore, a given server node may implement the QuickPath Interconnect (QPI) protocol, which is a point-to-point processor interconnect framework that enables a Non-Uniform Memory Access (NUMA) architecture for a cluster of processors, etc. The intra-node connection topology would include information regarding the types of arrangement of hardware connection elements including, but not limited to, switches (e.g., PCIe switches), Host Bridge, platform controller hub (PCH) etc.

In addition, the topology database 146 includes information regarding the types of network interface devices and topologies that are implemented by the server nodes for inter-node communication within the cluster 160. For example, inter-node topology information for a given server node can include port numbers of the servers, the type of network interface circuitry (and number of interface cards)

that a given server utilizes to connect to other servers (and network components) including, but not limited to, network interface controllers (NICs) (e.g. SmartNICs, RDMA-enabled NICs), Host Bus Adapter (I-IBA) cards. Host Channel Adapter (HCA) cards, and the types of inter-node communication protocols that are used by the server nodes for network munication including, but not limited to, protocols such as TCP/IP, Gigabit. Ethernet (GbE) (e.g., 10/25/40/100 GbE), RDMA, IB, Message Passing Interface (MPI), etc.

The topology database 146 further includes information regarding predefined (yet configurable) performance metrics (or rank scores) that are accorded to different intra-node and inter-node connection topologies. For example, in one embodiment, an NVLink connection topology is accorded a higher performance score than a PCIe connection topology as NVLink is a faster communication protocol. As explained in further detail below, the computing resource scheduling and provisioning module 142 utilizes the performance metrics in conjunction with a set of heuristic rules to schedule and provision a set of accelerator resources (e.g., GPU resources) for a given job (which reside on one or more server nodes), which have the same or similarly-matched connection topologies (as indicated by the performance metrics) so as to optimize the communication performance between the provisioned devices for executing the given job.

For example, when provisioning accelerator devices in a logical ring communication (e.g., Ring AllReduce), since the slowest communication path in the logical ring determines the overall communication performance, the computing resource scheduling and provisioning module 142 is configured to schedule and provision accelerator devices having a same high-performance connection topology and avoid mixing higher-performance with lower-performance connection topologies, except when needed. When different connection topologies are used to provision accelerator devices for a given job, the computing resource scheduling and provisioning module 142 will utilize the performance metrics in conjunction with predefined rules to determine a set of accelerator devices with similarly-matched connection topologies, to minimize waste of communication resources.

The topology database 146 can be implemented using a Structured Query Language (SQL) database or a NOSQL database (e.g., as Key-Value DB), which provides sufficiently fast performance (could be loaded all in memory) for quick query by the computing resource scheduling and provisioning module 142. As explained in further detail below, the computing resource scheduling and provisioning module 142 will access the information (connection topology and performance metrics) within the topology database during a provisioning operation, to dynamically identify and allocate a set of accelerator devices (e.g., GPU devices) which can be provisioned for a given job.

The resource usage database 148 comprises a centralized datastore which stores various types of information regarding the usage of computing resources across the server node cluster 160. For example, the resource usage database 148 maintains a record of the provisioned devices for each pending/active job being executed by the computing service platform 130. A given record will identify a set of accelerator devices that are provisioned for a given job, and the logical communication order (e.g., ring communication) of the provisioned devices. These records are generated by the computing resource scheduling and provisioning module 142 during a provisioning process, and stored in resource usage database 148 until job completion.

The resource usage database 148 maintains information regarding current bus networking usage in terms of bandwidth (MB/s). The bandwidth usage of communication links between provisioned accelerator devices executing a pending job can be continually measured/tracked and periodically reported by the reporting agents 162 (e.g., every 5 second). The computing resource scheduling and provisioning module 142 is configured to consider the current status of bus/networking connection usage (bandwidth) to fully utilize bidirectional bus/networking between provisioned devices. For example, when a PCIe bidirectional link between two GPU devices provisioned for a given job is being utilized in only one direction (e.g., logical ring configuration), then the same GPU devices can be provisioned for another job but with a different communication order such that other direction of the PCIe bidirectional link is utilized, thereby making g optimal use of such PCIe bidirectional link.

The reporting agents 162 comprise software or firmware that run on the GPU server nodes 160-1, 160-2, . . . , 160-*n* to collect relevant server hardware information and usage and report such information to the central topology and usage databases 146 and 148. In addition, reporting agents may run on switch devices that are configured within the backbone networking infrastructure of the service platform network 150. A reporting agent 162 executing on a given GPU server node may report computing resource information to service control 140 such as: (i) GPU model and usage (e.g., NVidia P100, P40, etc.); (ii) intra-node bus topology information (PCIe, NVLink, NUMA/QPI, etc.); and (iii) inter-node connection information (e.g., NIC, SmartNIC, RDMA-enabled NIC, switch, 10/25/40/100 GbE, port number, NUMA node connection, RDMA-enabled or not, etc.

Furthermore, a reporting agent 162 executing on a given GPU server node or switch can collect and periodically report bus or networking bandwidth usage information (i.e., percent of usage). The reporting period is a configurable parameter which can be selected, as desired, to obtain real-time or near real-time bandwidth usage information. For example, the reporting period for current bandwidth usage can be set to 5s. On the other hand, the topology information can be periodically reported at a longer period, e.g., every 10 min, as topology changes (e.g., hardware upgrades or replacement) occur less frequently than bandwidth usage.

In one embodiment of the invention, the reporting agents 162 can determine the hardware configuration and hardware interconnect topology for a GPU server node can be determined by analyzing a layer of low-level system drivers. The hardware information and interconnect topology detection process can be implemented by composing and analyzing device/system cmd-query results, typically via low-level HW drivers, library or APIs. For example, NVidia GPU has CUDA API and utilities such as the System Management Interface (nvidia-smi) (which is a command line utility) which can detect GPU devices on a given GPU server node, along with corresponding interconnect paths between the GPU devices and other hardware component of the given GPU server node. Moreover, for CPUs, command utilities such as lscpu, numactl, etc., can be used to determine information regarding the CPU architecture (number of CPUs, threads, cores, sockets, NUMA nodes, CPU caches vendor, family, model, etc.) present on the given GPU server node. Moreover, utilities such as lspci, Mellanox OpenFabrics Enterprise Distribution (OFED), and vendor specific command (cmds) can be used to determine information regarding network adapters (NICs, HBAs, etc.) that are implemented in a given GPU server node.

The computing resource scheduling and provisioning module 142 is configured to implement a topology aware provisioning process that is based on a "weighted" consideration of factors including current cluster topology and bandwidth usage, which enables the computing service platform 130 to provide intelligent, optimized computing infrastructures that can fully utilize state-of-the-art hardware accelerators (e.g., GPU, FPGA etc.) and better serve emerging workloads like distributed deep learning, or other HPC workloads. While the exemplary scheduling and provisioning methods discussed herein can be implemented for various HPC applications, for illustrative purposes, the exemplary methods will be discussed in the context performing distributed DL training for Deep Neural Network (DNN) applications in a heterogeneous computing environment. In addition, embodiments of the invention will be discussed in the context of parallelizing DL training of a neural network using a plurality of accelerator devices (e.g., GPU devices) in a logical ring communication framework such as the known Ring AllReduce communication protocol.

A DL model is typically utilized in machine learning applications for pattern recognition, image processing, and other artificial intelligence applications. A DL application can utilize a DNN, wherein a DNN comprises a feedforward artificial neural network with multiple hidden layers. A convolutional neural network (CNN) is one class of DNN which is commonly applied for analyzing images. A CNN comprises a sequence of functional layers including an input layer, an output layer, and a plurality of hidden layers between the input and output layers. The functional layers include, but are not limited to, convolutional layers, pooling layers, fully connected layers, normalization layers, etc.

A convolutional layer applies a "convolution operation" to an input dataset, and passes the processing results to the next layer in the network. As is known in the art, a convolutional layer applies filters (alternatively referred to as neurons or kernels) across all regions of an input dataset, wherein each filter is spatially smaller than the full volume of the input data set. The filters of a convolutional layer each comprise a set of learnable parameters (or weights), which are learned using a DL model training process. A convolutional layer utilizes a set of filters to perform a forward pass through an input dataset, wherein each filter slides (or convolves) across the width and height of the input volume and computes dot products between the entries of the filter and the input data at any position (i.e., receptive field). In essence, the convolution layer computes an output of neurons which are connected to corresponding local regions in the input data.

A DL model training process is both computing heavy and memory intensive, requiring a significant amount of computing resources and memory usage. For example, a DL training process to train a DL model is a compute intensive task that requires the loading of mini-batch samples on worker server nodes, and performing repeated iterations (forward and back-propagation) on the mini-batch dataset using computing resources (on GPU, CPU, or other types of processors) until error conditions are met. Depending on the application, a given training dataset for training a DL model can on the order of terabytes (TB) in total size. Multiple accelerator devices (e.g., GPU devices) are commonly deployed to speed up the training using a data parallelism programming model.

With data parallelism, each GPU device has access to a complete copy of a given deep learning model, wherein each GPU executes a thread using the same weights (model parameters), but with different mini-batches of data, wherein processing results (e.g., gradients) are synchronized (e.g., averaged) after each processing iteration of a mini-batch dataset. By way of specific example, DL training can be performed using a data parallel stochastic gradient descent (SGD). With this process, each GPU device has a copy of the entire neural network model and for each iteration is assigned a subset of the data samples in a minibatch. For each iteration, every GPU runs forward propagation of the network on its data, followed by error backpropagation to compute a gradient with respect to the network parameters. Finally, the GPUs communicate with each other to average the gradients computed by the different GPUs, apply the averaged gradient to the weights to obtain new weights.

In some distributed applications, parallelized training of a neural network using multiple GPUs is performed using a parameter server (PS) framework. A parameter server framework provides a communication synchronization protocol in which multiple accelerator devices (e.g., GPU worker nodes) involved in a parallel distributed DL training process can share and have access to a most recent set of global averaged parameters. In general, a parameter server framework comprises one or more parameter server nodes which host and manage master jobs and globally shared parameters, to support distributed accelerated computing (e.g., deep learning, etc.) over a plurality of worker server nodes having accelerator devices (e.g., GPU devices). A parameter server framework supports accelerated computing for distributed machine learning problems, wherein the data and machine learning workloads, which are associated with the master jobs, are distributed over worker server nodes, and wherein the worker server nodes can access the globally shared parameters on the parameter nodes. The globally shared parameters represent the model parameters (e.g., dense/sparse vectors, weights, etc.) that are computed by worker server nodes during a training phase, and aggregated/combined/synchronized by the parameter server nodes. Each worker server node can store and process a local portion of the training data to compute local model parameters, and communicate with the parameter server nodes to update and retrieve the globally shared model parameters.

A parameter server framework can implement parallel processing across the worker server nodes for deep learning application using data parallelism programming models. With data parallelism, each worker server node has access to a complete copy of a given deep learning model, but each worker server node operates on a different portion of the overall dataset, wherein the computation results from each worker server node are combined by the parameter server nodes. For neural networks, data parallelism involves each executing thread using the same weights (model parameters), but with each executing thread processing different mini-batches of data, wherein processing results (e.g., gradients) are synchronized (e.g., averaged) after each processing iteration of a mini-batch dataset. For example, in a parameter server framework, each worker GPU will compute a gradient on its subset of the minibatch, and then each worker GPU sends its computed gradient to a single parameter server, which takes the average of all the gradients, and sends the computed average back to the worker GPU devices.

As an alternative to a parameter server framework, the parallelized training of a neural network using multiple GPUs can be performed using the known Ring AllReduce communication protocols. In terms of computation operations, an "all-reduce" operation is equivalent to a reduction operation which reduces the results to one process, followed by a broadcast operation to distribute the results to all processes. With regard to distributed computing using multiple GPU devices, an all-reduce operation combines the processing results from all GPU devices, and distributes the combined processing results to all GPU devices.

The Ring AllReduce protocol is a bandwidth-optimal collective communication method with origins in distributed HPC applications, which provides good scalability and performance. The Ring AllReduce protocol is currently being applied in DL frameworks (e.g., Tensor flow) for distributed DL training. Essentially, with Ring AllReduce, all accelerator devices (or workers) are configured in a logical ring with a specific order, and operate in a peer relationship. With the Ring AllReduce protocol, there is no central/dedicated parameter server, and each worker has a full copy of parameters, and synchronizes with its two neighbors in the communication ring in a clock-wise, or anticlockwise, direction. After two internal process stages (ScatterReduce and AllGather process stages), all GPU devices are synchronized. The Ring AllReduce is an algorithm for which the communication cost is constant and independent of the number of GPUs in the system, and is determined solely by the slowest connection between GPUs in the system.

Figure 2A:
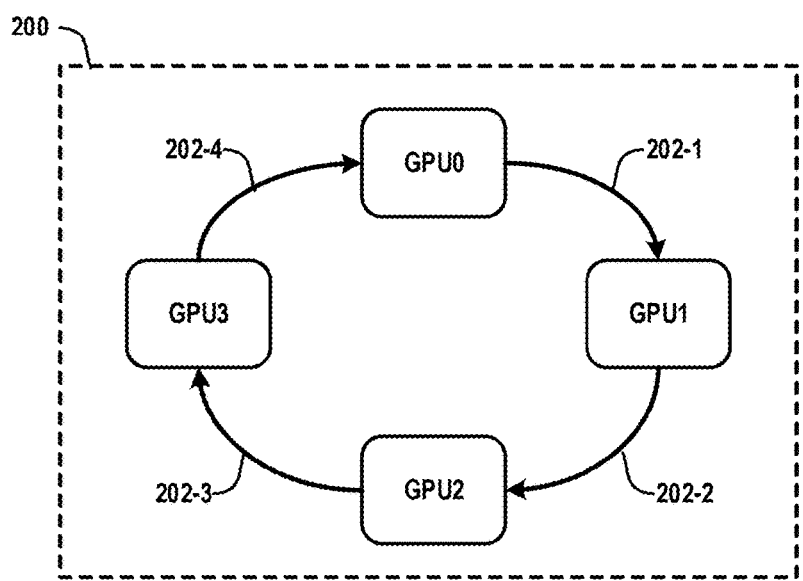
FIGS. 2A and 2B schematically illustrate alternative embodiments for configuring a plurality of GPU devices in a ring communication configuration to implement all-reduce operations for distributed DL training, wherein FIG. 2A schematically illustrates a plurality of GPU devices configured in a logical communication ring on a single server node, and wherein FIG. 2B schematically illustrates a plurality of GPU devices configured in a logical communication ring across multiple server nodes.
Figure 2B:
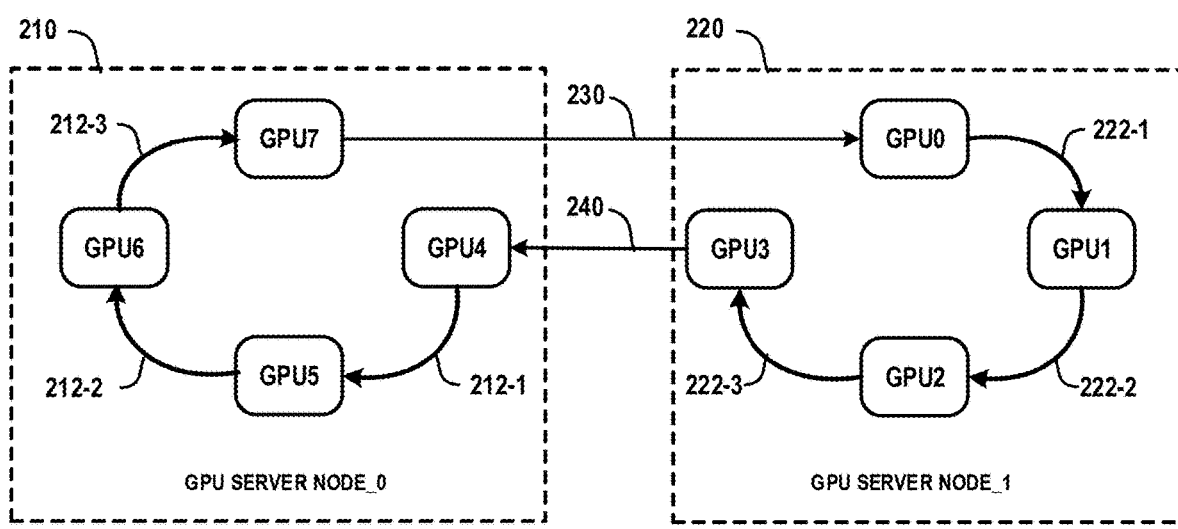

FIGS. 2A and 2B schematically illustrate alternative embodiments for configuring a plurality of GPU devices in a ring communication configuration to implement all-reduce operations for distributed DL training. In particular, FIG. 2A schematically illustrates a plurality of GPU devices configured in a logical communication ring on a single server node 200. In the illustrative embodiment of FIG. 2A, the plurality of GPU devices comprises four GPU devices, GPU0, GPU1, GPU2, and GPU3, which are arranged in a logical ring with intra-node communication links 202-1, 202-2, 202-3, and 202-4 (collectively, intra-node communication links 202) to communicate in a clockwise direction. In particular, GPU0 sends data to only GPU1 over the intra-node communication link 202-1, GPU1 sends data to only GPU2 over the intra-node communication link 202-2, GPU2 sends data to only GPU3 over the intra-node communication link 202-3, and GPU3 sends data to only GPU0 over the intra-node communication link 202-4. The intra-node communication links can be implemented using, e.g., NVLink, PCIe, etc.

For a distributed DL training operation, each GPU device GPU0, GPU1, GPU2, GPU3 has access to an entire dataset (current minibatch data set), and each GPU device partitions the entire dataset into small chunks. In particular, for the ScatterReduce process, each GPU device GPU0, GPU1, GPU2, GPU3 in the logical communication ring will partition the dataset into N smaller chunks, where N is the number of GPUs in the ring. The GPUs will then perform N−1 iterations of the ScatterReduce process, where in each iteration, each GPU will send one of its data chunks to its right neighbor, and will receive a chunk from its left neighbor and accumulate the corresponding data chucks. The data chunk that is sent and received by each GPU is different in each iteration. At the end of the ScatterReduce stage, each GPU device GPU0, GPU1, GPU2, GPU3 will have one complete data chunk which comprises an accumulation of all final values in that chunk (i.e., the one complete data chunk includes the contribution from all the GPU devices GPU0, GPU1, GPU2, GPU3. In order to complete the AllReduce operation, the GPUs perform an AllGather process to exchange those data chunks, so that all at the completion of the AllGather process, each GPU GPU0, GPU1, GPU2, GPU3 will have the fully accumulated values for the entire dataset.

In the Ring AllReduce protocol, each of the N GPUs will send and receive values N−1 times for the scatter-reduce process, and N−1 times for the AllGather process. For each iteration, the GPUs will send K/N values, where K is the total size of the dataset. Therefore, the total amount of data transferred to and from every GPU for the entire Ring AllReduce operation is: Data Transferred=2(N−1)*K/N, which is essentially independent of N. Since every data chunk transfer occurs synchronously in discrete iterations, the speed of the Ring AllReduce operation is limited by the slowest (lowest bandwidth) connection between adjacent GPUs in the logical ring.

The Ring AllReduce can be applied to data-parallel DL training and minimize communication overhead by exploiting the neural network structure. Indeed, for every iteration during a DL training process, each GPU device performs a forward propagation process to compute errors, followed by a backward propagation process to compute gradients for each of the parameters of the neural network. The backpropagation process computes the gradients starting from an output layer and moving towards an input layer, which means that gradients for the output layer parameters are available significantly before gradients for the previous layers. Since the AllReduce operation can operate on a subset of the parameters of the network at a time, the AllReduce operations can start on the output layer parameters while the other gradients are still being computed. This allows the communication to be overlaid with the rest of the computation in the backpropagation step, which effectively reduces the total amount of time each GPU needs to wait for the communication to be complete. In other words, for a DL backpropagation process, we can overlap the layer (i−1) computing and the layer (i) gradient communication, thereby avoiding massive bust traffic.

FIG. 2B schematically illustrates a plurality of GPU devices configured in a logical communication ring across multiple server nodes 210 and 220. In the illustrative embodiment of FIG. 2A, the plurality of GPU devices comprises eight GPU devices, GPU0, GPU1, GPU2, GPU3, GPU4, GPU5, GPU6, and GPU7, which are arranged in a logical ring. The server node 220 comprises GPU devices, GPU0, GPU1, GPU2, and GPU3 and intra-node communication links 222-1, 222-2, and 232-3 (collectively, intra-node links 222). The server node 210 comprises GPU devices, GPU4, GPU5, GPU6, and GPU7 and intra-node communication links 212-1, 212-2, and 212-3 (collectively, intra-node links 212). The GPU device GPU7 in the server node 210 communicates with the GPU device GPU0 in the sever node 220 over an inter-node communication link 230, and the GPU device GPU3 in the server node 220 communicates with the GPU device GPU4 in the sever node 210 over an inter-node communication link 240.

With the logical communication ring shown in FIG. 2B, communication occurs in a clockwise direction wherein GPU0 sends data to only GPU1 over the intra-node communication link 222-1, GPU1 sends data to only GPU2 over the intra-node communication link 222-2, GPU2 sends data to only GPU3 over the intra-node communication link 222-3, GPU3 sends data to only GPU4 over the inter-node communication link 240, GPU4 sends data to only GPU5 over the intra-node communication link 212-1, GPU5 sends data to only GPU6 over the intra-node communication link 212-2, GPU6 sends data to only GPU7 over the intra-node communication link 212-3, and GPU7 sends data to only GPU0 over the inter-node communication link 230. The intra-node communication links 212 and 222 can be implemented using, e.g., NVLink, PCIe, etc. The inter-node communication links 230 and 240 can be implemented using TCP, IB, RDMA, GPUDirect, etc.

The GPU ring communication framework of FIG. 2B can implement the Ring AllReduce protocol, as outlined above, to perform distributed DL training operation using GPU devices provisioned on two or more server nodes. The GPU devices can communicate, point-to-point, using a communication protocol such the known Message Passing Interface (MPI) communication protocol. The MPI communication framework utilizes a standard syntax to provide virtual topology, synchronization, and communication functionalities between a set of GPU devices that have been mapped to nodes/servers/computer instances. For example, a CUDA-aware MPI implementation can be utilized to transfer data between GPU devices using GPUDirect RDMA.

In a heterogeneous server cluster or large cloud environment with various kinds of server node topologies (each with many instances) and/or complex interconnections, even when the GPU devices are identical, the different connection topologies can have a significant impact on overall performance and resource utilization. The basic AllReduce communication protocol is not "topology-aware" (i.e., does not consider cluster wide topology), which can lead to under-utilization of the computing resources (due to unmatched bus/networking connection topologies) or overloaded communication links between the computing resources (bus bottleneck). These performance differences will be illustrated with regard to different hardware and intra-node connection topologies of a server node as schematically shown in FIGS. 3A, 3B, 3C, 3D and 3E.

Figure 3A:
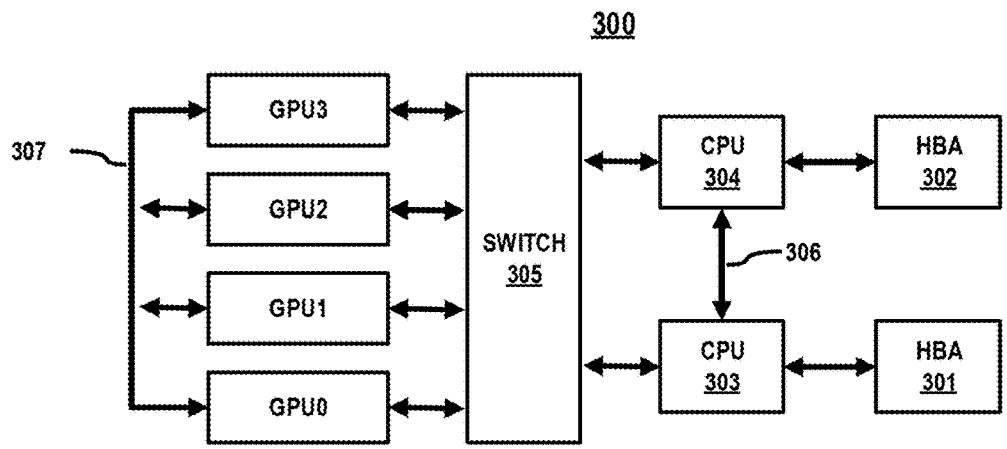
FIGS. 3A, 3B, 3C, 3D, and 3E are high-level schematic illustrations of different hardware architectures of GPU server nodes.

In particular, FIG. 3A schematically illustrates a hardware topology of a GPU server node 300 which comprises a first HBA 301, a second HBA 302, a first multicore CPU 303, a second multicore CPU 304, a PCIe switch 305, and a plurality of GPU cards GPU0, GPU1, GPU2, and GPU3. The CPUs 303 and 304 are electrically and mechanically connected to a motherboard using CPU sockets, as is known in the art. The CPUs 303 and 304 can be configured in a cluster using the NUMA cluster configuration technology, which allows the CPUs 303 and 304 to share local memory and an I/O bus or data path via SMP (symmetric multiprocessing). A socket-level link 306 between the CPUs 303 and 304 can be implement using a QuickPath Interconnect (QPI) point-to-point processor interconnect technology. The PCIe switch 305 is used between the CPUs 303 and 304 and the four GPUs GPU0, GPU1, GPU2, and GPU3 to allow direct GPU-CPU communication between the CPUs and any of the GPUs. The GPUs GPU0, GPU1, GPU2, and GPU3 can be interconnected (via communication links 307) using any suitable wire-based communications protocol such as NVLINK developed by NVidia. NVLINK allows for transferring of data and control code between the GPUs, and can also be used for communication between the GPUs and CPUs. In alternate embodiments of the hardware configuration 300, (i) only one network interface card may exist (e.g. HBA 301 attached to CPU 303), (ii) only CPU 303 is attached to the GPUs via the switch 305, and/or (iii) the GPU communication links 307 between the GPUs do not exist.

Figure 3B:
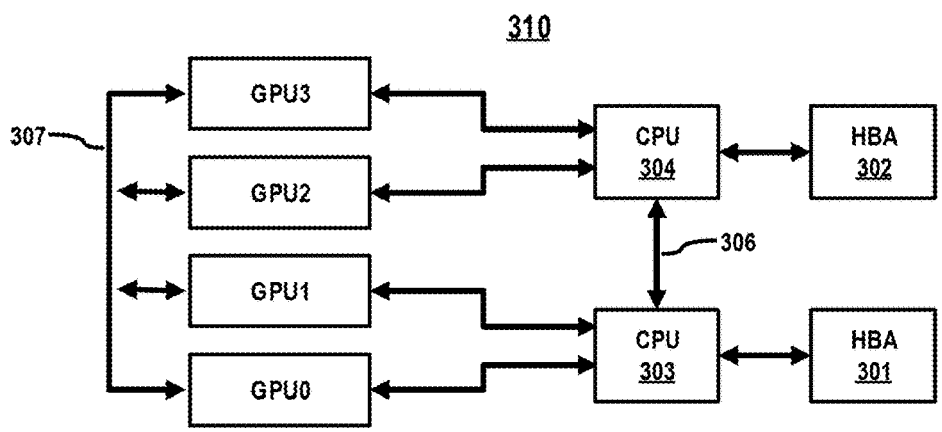
Figure 3C:
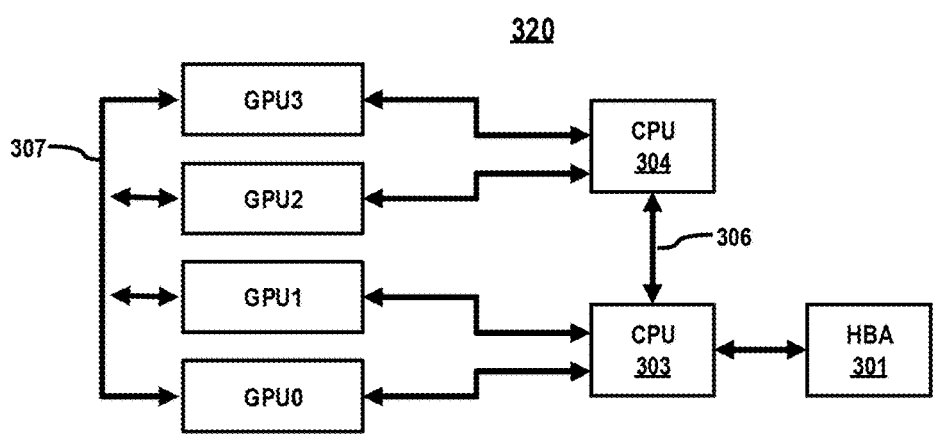

FIG. 3B schematically illustrates a hardware topology of a GPU server node 310 which is similar to the hardware topology of FIG. 3A, except that in FIG. 3B, the first CPU 303 is directly connected to the first and second GPUs (GPU0 and GPU1) via a PCIe switch and/or PCIe host bridge (not specifically shown), and the second CPU 304 is directly connected to the third and fourth GPUs (GPU2 and GPU3) via a PCIe switch and/or PCIe host bridge (not specifically shown). With this topology, the GPUs are split into two domains attached to different CPU sockets. Further, FIG. 3C schematically illustrates a hardware topology of a GPU server node 320 which is similar to the hardware topology of FIG. 3B, except that in FIG. 3C, only one HBA 301 is used, which is connected to the CPU socket of the first CPU 303. In alternate embodiments of the hardware configuration 300, (i) only one network interface card may exist (e.g. HBA 301 attached to CPU 303), and/or (ii) the GPU communication links 307 between the GPUs do not exist.

Figure 3D:
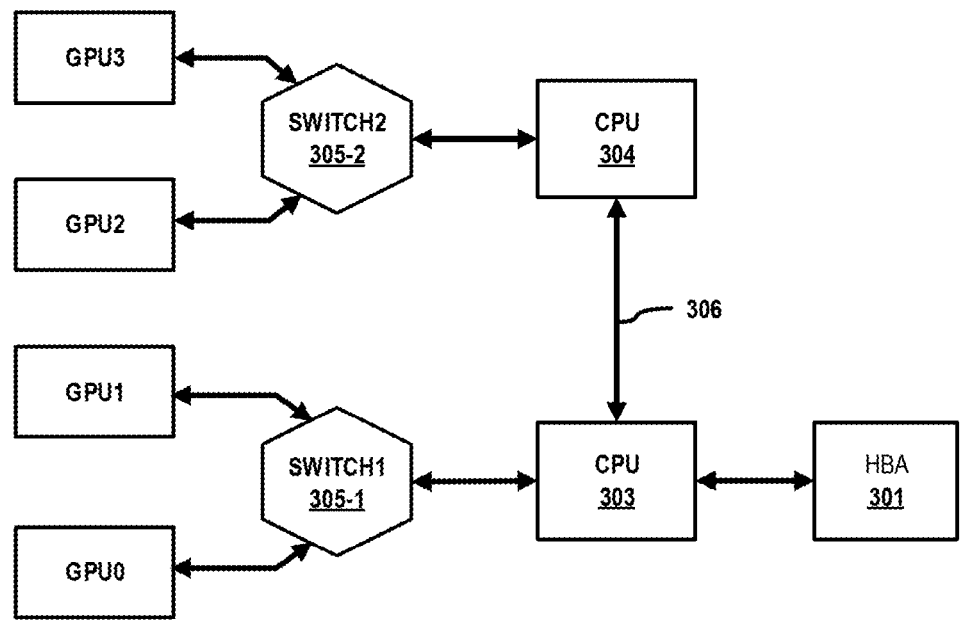

Next, FIG. 3D schematically illustrates a hardware topology of a GPU server node 330 which is similar to the hardware topology of FIG. 3C, except that the hardware topology in FIG. 3D comprises two separate switches 305-1 and 305-2. The switch 305-1 enables direct communication between the CPU 303 and the GPU0 and GPU1 devices, and the switch 305-2 enables direct communication between the CPU 304 and the GPU2 and GPU3 devices. In addition, the configuration 330 of FIG. 3D enables direct communication between the GPU0 and GPU1 devices via the switch 305-1, and direct communication between GPU2, and GPU3 devices via the switch 305-2. However, communication between GPU0 and GPU2, for example, would require communication via the CPUs 303 and 304 through the socket link 306.

Figure 3E:
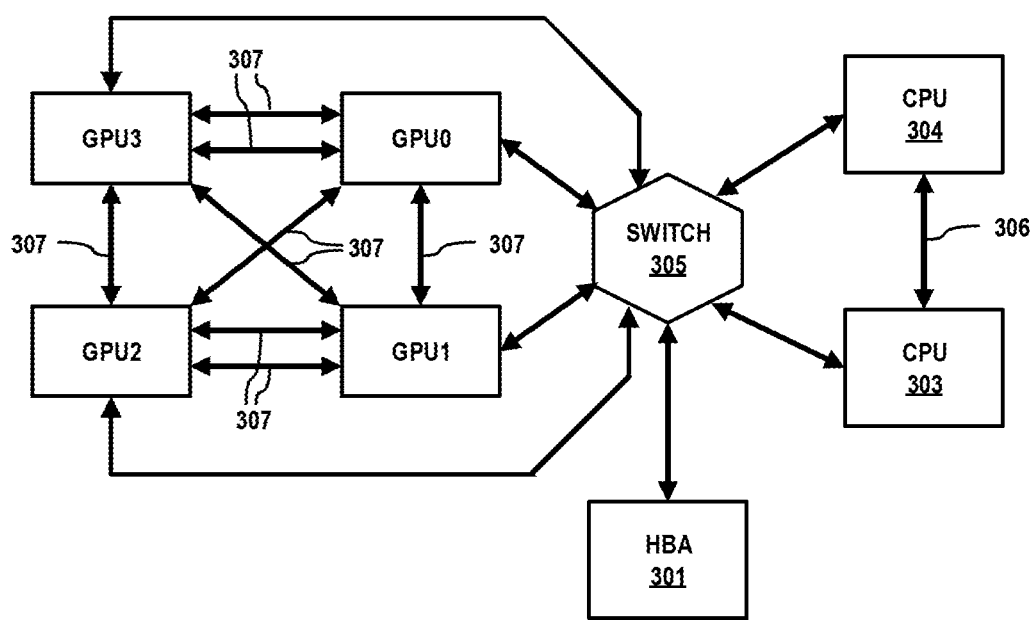

FIG. 3E schematically illustrates a hardware topology of a GPU server node 340 which is similar to the hardware topology of FIG. 3A, except that FIG. 3D specifically illustrates the HBA 301, CPUs 303 and 304, and GPU0, GPU1, GPU2, and GPU3 devices all commonly connected to one switch 305. In addition, the configuration 340 of FIG. 3E includes multiple communication links (e.g., NVLink) between the GPU0 and GPU3 devices, and between the GPU1 and GPU2 devices.

In a typical heterogeneous computing cluster or typical cloud environment, the constituent computing nodes can be implemented using various hardware and interconnection configurations, as illustrated in FIGS. 3A through 3E, each of which providing different performances. A given server node technology can have multiple configurations, where each configuration may have multiple GPU devices that are accessed using various connection topologies, e.g., NUMA connections, PCIe connection, NVLink connections, etc. In addition, the networking infrastructure (e.g., network interface cards, switches, etc.) can operate at different bit rates (e.g., 10/25/40/100 GbE). Furthermore, the initiation and completion of jobs executing in a given cluster is dynamic, wherein the allocation and usage of computing and networking resources dynamically changes over time.

Furthermore, given an incoming job request for, e.g., a distributed deep learning job that request the use of N GPU devices, the number N of requested GPU device can be much larger than the capability of a single GPU server node (e.g., GPU server node typically include 4 or 8 GPU accelerator devices). As such, the requested job would need GPU resources to be provisioned from multiple GPU server nodes. For example, the number N of GPU accelerator devices that are used to perform DL training can be 128 or more, thereby requiring at least 32 GPU server nodes (when the GPU server nodes each comprise 4 GPU devices). Moreover, the job request may specify specific types/models of GPU devices (e.g., NVidia P100) to service the request.

In some embodiments, the computing resource scheduling and provisioning module 142 is configured to implement a topology aware provisioning process, which takes into consideration server node topology and bandwidth usage, to schedule and provision a set of accelerator devices (e.g., GPU devices) in logical ring configuration to execute an HPC job (e.g., DL training) using the Ring-AllReduce protocol. Conventional provisioning techniques for the Ring-AllReduce protocol do not consider node topology (and assume homogeneous nodes), and simply provision GPU devices in a pre-defined, random ring sequence, which can adversely impact performance. With the Ring-AllReduce protocol, the provisioned GPU devices are tightly coupled as a communication ring, and while the GPU devices may be identical in computation, the slowest bus/ networking communication link between two neighboring GPU devices in the logical communication ring will determine the overall communication performance. This can lead to suboptimal performance, when for example, GPUs with faster interconnection (e.g., NVLink, 100 GbE) are connected to GPUs with much slower interconnection (QPI, 10 GbE GPUs node), in which case the configuration leads to wasted resources.

Another issue to consider is the potential for low resource utilization when using bi-directional communication links in an ordered ring communication protocol such as Ring All-Reduce in which communication is always unidirectional (clockwise or counter-clockwise). Indeed, as noted above, the GPU devices in a Ring AllReduce configuration will always communicate in a fixed unidirectional fashion (such as clock-wise) in accordance with the configured GPU sequence. If the GPU devices are always configured with a fixed order, and bidirectional communication links are utilized between the GPU devices, this means that only 50% of a bidirectional bus or interconnection is utilized. As an example, in some server architectures (e.g., Dell C4130) a GPU Peer-to-Peer feature is enabled for bidirectional PCIe communication wherein PCIe version PCIe 3.0×16 can achieve 24+GB/s bidirectional bandwidth, but would be limited to 12+GB/s of both directional links were not utilized. Similarly, the NVIDIA NVLink communication protocol can achieve 72 GB/s bidirectional bandwidth, but would be limited to 36 GB/s if both directional links were not utilized.

Another factor to consider is resource competition and overload for a bi-directional data links. For example, if two or more jobs are executing separate AllReduce operations on a same set of ring-configured GPU devices (connected via bidirectional links), and operating in the same logical direction, this would result in only 50% of a given bidirectional data bus being used by multiple concurrent jobs. This could lead to bus overload and communication bottlenecks due to the GPUs sending and receiving data in one direction by multiple concurrently executing jobs. Embodiments of the invention would take such communication direction into consideration by, e.g., provisioning a set of GPU devices in a logical ring configuration to execute multiple, independent AllReduce operations, but assigning the jobs different logical sequences to fully utilize the bidirectional communication links and mitigate potential communication bottlenecks.

To address these issues in a shared, heterogeneous computing environment, systems and methods according to embodiments of the invention are provided to intelligently and dynamically provision accelerator devices (e.g., GPU device) in a way that optimizes resource usage. The term "dynamically" as used herein refers to provisioning functionalities that include (1) determining a current interconnection topology and current bandwidth usage of computing resources over a server cluster, and (2) utilizing performance scores of different topologies in conjunction with heuristic rules to determine an optimal set of accelerator devices to provision for a given HPC job. As demonstrated in further detail below, provisioning methods are configured to dynamically schedule and provision a set of accelerator devices (e.g., GPU devices) for a given job such that all or most of the accelerator devices within the set belong to a same interconnect domain, to thereby optimize performance and resource usage, while avoiding the scheduling and provisioning of a set of accelerator devices for the given job, which would require cross-domain interconnections, and result in potential waste of resources and degraded performance.

Figure 4:
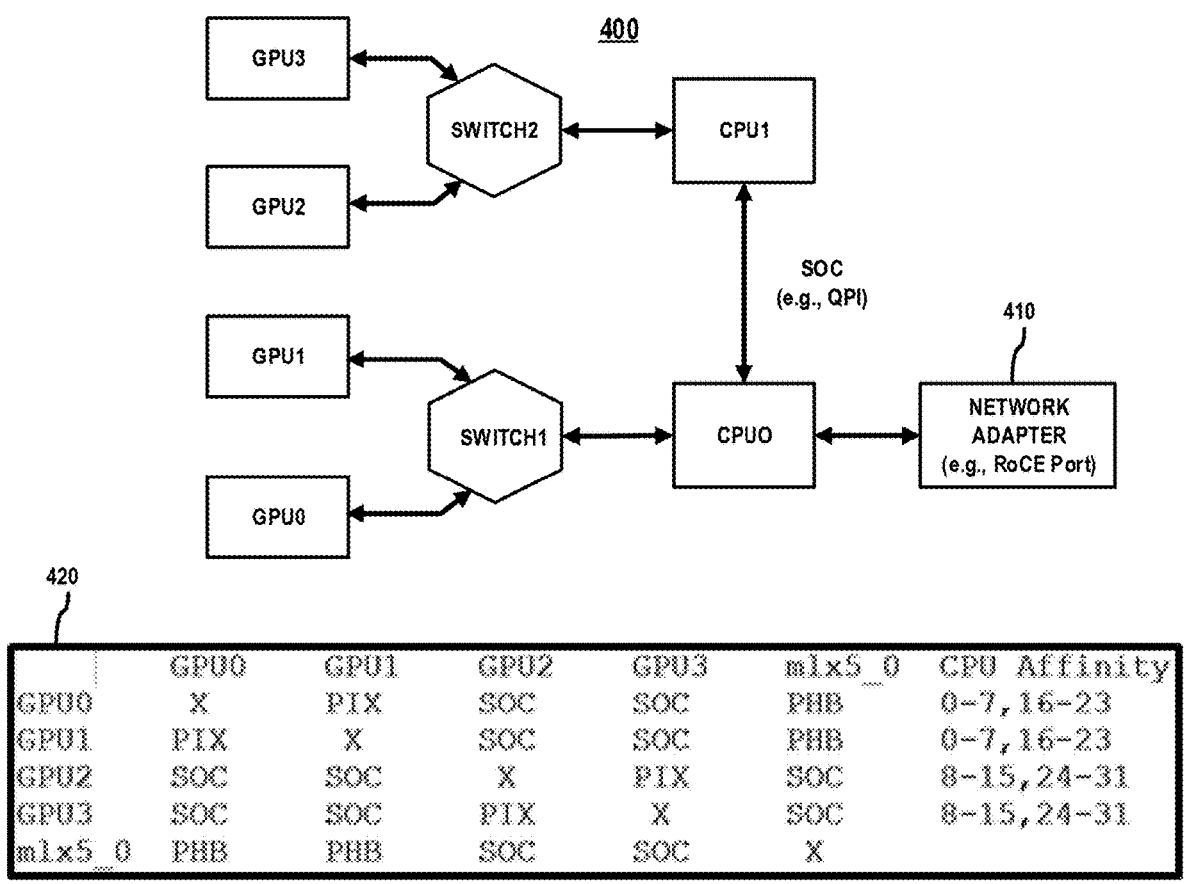
FIG. 4 illustrates an example hardware topology of a GPU server node, and a corresponding system topology view that is generated using a topology detection utility function, according to an embodiment of the invention.

FIG. 4 illustrates an example hardware topology of a GPU server node 400, and a corresponding system topology view 420, which can be generated and reported by a reporting agent 162 (FIG. 1) using a topology detection command utility, according to an embodiment of the invention. As schematically illustrated in FIG. 4, the hardware topology of the GPU server node 400 comprises a network adapter 410, first and second CPUs (CPU0 and CPU1), first and second switches (SWITCH1 and SWITCH2), and a plurality of GPU devices (GPU0, GPU1, GPU2, and GPU3). In the illustrative embodiment of FIG. 4, it is assumed that the network adapter 410 is implemented using a RDMA over Converged Ethernet (RoCE) network card (which allows remote direct memory access (RDMA) over an Ethernet network), that the first and second switches (SWITCH1 and SWITCH2) comprise internal PCIe switches, and that the first and second CPUs (CPU0 and CPU1) are interconnected using a socket-level interconnect such as QPI.

The system topology view 420 illustrated in FIG. 4 provides information regarding the interconnect paths between the GPU devices (GPU0, GPU1, GPU2, and GPU3) and between the network adapter 410 and the GPU devices (GPU0, GPU1, GPU2, and GPU3). In the system topology view 420, the term X denotes self, other terms as defined as set forth in the following table:

TABLE 1

| CONNECTION TYPE | DESCRIPTION |
| --- | --- |
| NVLINK | GPU Interconnect Path Includes NVLINK |
| PIX | GPU Interconnect Path Includes an Internal PCIe Switch |
| PXB | GPU Interconnect Path Includes Multiple Internal PCIe Switches |
| PHB | GPU Interconnect Path Includes a PCIe Host Bridge |
| SOC | GPU Interconnect Path Includes a Socket-Level Link (e.g., QPI) |

The system topology view 420 includes information which indicates that: (i) 4 GPUs were detected in the example topology 400; (ii) GPU0 and GPU1 are interconnected via an internal PCIe switch (PIX) with a CPU affinity to NUMA socket 0 (CPU0-7, 16-23), connected with Mellanox RoCE (single port) (m1×5_0) via host PCIe switch (PHB); and that (iii) GPU2 and GPU3 are interconnected via an internal PCIe switch (PIX), with a CPU affinity to NUMA socket1, with a long communication path between the Mellanox RoCE card and GPU2/GPU3.

In one embodiment of the invention, a configurable rank scoring scheme is implemented to quantify a performance of the different connection types set forth in the above TABLE 1. In particular, a configurable rank scoring scheme is utilized to provide a performance metric of a given interconnect type with regard to factors such as speed and interconnect distance, wherein a lower value of a rank score denotes an interconnect path closer in distance and/or faster in performance, whereas a larger value of a rank score denotes an interconnect path further in distance and/or slower in performance. For example, NVLink is much faster than PCIe G3, so an NVLink connection type is accorded a top-ranking performance score (although such score is configurable as an NVLink connection can exhibit a cross-chassis behavior which is different that an in-chassis behavior). Furthermore, a GPU/NIC interconnect path that includes a SOC connection (across a QPI link between CPUs) can exhibit a significant loss in performance and is therefore accorded a lower ranking performance score based on a large penalty. By way of further example, the scoring method can be expanded by not only evaluating the bus/interconnection types, but also the actual or theoretical operating characteristics or metrics of the HW and/or given HW generation. For example, a metric may include a theoretical maximum operating frequency for PCIe G2/G3/G4 or an actual operating bandwidth of such HW operating in the GPU server node, etc.

FIG. 5A illustrates a data structure 500 which comprises configurable rank scores (or more generally, performance metrics) for different types of possible intra-node connections in a given GPU server topology, according to an embodiment of the invention. More specifically, the data structure 500 comprises predefined (yet configurable) rank scores for the different types of possible connections as discussed above in conjunction with TABLE 1. As shown in FIG. 5A, a highest rank score (e.g., 10) is accorded to an NVLink type connection that exists in a GPU interconnect path, while a lowest rank score (e.g., 1) is accorded to a GPU interconnect path that includes a SOC type connection. In some embodiments, the different rank scores are determined based on prior knowledge, or based on a service provider benchmark.

Next, FIG. 5B illustrates a data structure 510 which comprises configurable rank scores (or more generally, performance metrics) for different types of possible inter-node connections between GPU server nodes, according to an embodiment of the invention. In particular, the data structure 510 illustrates configurable rank scores associated with a different Ethernet communication protocols (e.g., 100/40/25/10 GbE) implement by network interface cards of GPU server nodes for inter-node communication between GPU server nodes. As shown in FIG. 5B, higher rank scores are accorded to faster Ethernet communication protocols. In addition, Ethernet connections that are RDMA-enabled (e.g., RoCE) are accorded rank scores that are 2× the rank scores of corresponding non-RDMA enabled Ethernet communication protocols.

The rank score information maintained in the performance metric data tables 500 and 510 of 5A and 5B is utilized in a process (e.g., FIG. 6) for dynamic scheduling and provisioning GPU resources, according to embodiments of the invention. The rank score values in the data tables 500 and 510 are configurable values that can change over time, in which case performance metrics tables can be updated with newly configured rank scores (or more generally, performance metrics) for one or more intra-node and inter-node interconnect types. The data structures 500 and 510 provide exemplary embodiments of the type of predefined (yet configurable) performance metrics that can be maintained in the topology database 146 (FIG. 1).

FIG. 6 is a flow diagram of a method for dynamically scheduling and provisioning computing resources in a distributed heterogeneous computing environment, according to an embodiment of the invention. In one embodiment of the invention, the method of FIG. 6 illustrates operating modes of the computing resource scheduling and provisioning module 142 of the service controller 140 shown in FIG.

1. At an initial stage of the GPU provisioning workflow of FIG. 6, a control server node (e.g., service controller node 140, FIG. 1) will receive a service request from a client system for GPU processing services (block 600). As noted above, the service request can specify various conditions on resource demands for executing a given job (e.g., DL training) associated with the service request. For example, the resource demands can specify a desired number (N) of GPU devices to provision for the requested job, the model/type of the GPU devices utilized, etc. The number (N) of GPU devices to be provisioned for a given job can be user-specified, or based on a service level agreement (SLA), or based on predefined policies of the service provider for handing a given job, etc.)

The control server node will determine a set of candidate GPU devices across the cluster of GPU server nodes which can meet the resource demands of the server request (block 602). For example, based on the resource demands of the service request, the control server node can determine a set of all qualified GPU devices across the server cluster which match the resource demands, and which are free for allocation. The set of candidate GPU devices can be GPU devices that reside on multiple GPU sever nodes. For example, a set of candidate GPU devices can be determined as follows: {Server1:GPU0~7, Server2:GPU0~3, Server3:GPU0~1; . . . ; Server9: GPU0~3}.

Next, the control server node will evaluate the candidate GPU devices using topology information in the topology database 146 to select an optimal set of GPU devices to provision for handling the service request (block 604). In this process, the control server node can utilize the rank score information contained in data tables (e.g., data tables 500 and 510) maintained in the topology database 146, in conjunction with heuristic searching rules, to simplify the scope of the filtering/searching process, since the process of determining an optimal set of GPU devices for handling the service request can be complex.

For example, one rule (e.g., Rule 1) can specify to determine a set of N GPU devices among the candidate GPU devices which have the same interconnection topology, starting from the highest ranked interconnection topology (e.g., NVLink, FIG. 5A), and then to lower ranked interconnection topologies (e.g., PIX, PXB, etc., FIG. 5A). For example, there may exist a plurality (N) of candidate GPU devices that reside on one or more server nodes which implement the NVLink communication protocol. In this instance, the set of N GPU devices which have the same NVLink interconnection topology can be selected for scheduling and provisioning. On the other hand, there may not be enough (less than N) candidate GPU devices that implement the highest ranked (e.g., NVLink) communication protocol, but rather there may be N candidate GPU devices that implement a next highest ranked (e.g., PCIe) interconnection topology. In this case, the set of N candidate GPU devices which implement the next highest ranked interconnection topology can be selected for scheduling and provisioning.

In other embodiments, if the service provider charges different costs for different interconnection topologies of GPU resources, the set of N GPU devices can be selected for a given service request based on a user-specified budget constraint. In this embodiment, it is assumed that lower ranked interconnection topologies have lower monetary costs. In such instance, even if there are N candidate GPU devices that implement the highest ranked (e.g., NVLink) communication protocol, depending on the user-specified cost constraints, the set N GPU devices can be selected to include those GPU devices which commonly have a lower ranked interconnection topology (e.g., PIX or PXB) so that the service cost for provisioning the service request meets the user-specified costs.

Furthermore, other rules may specify options for selecting candidate GPU devices in instances where there is not enough (less than N) candidate GPU devices with the same interconnection topology, such that the set of N GPU devices would have to include GPU with different interconnection topologies with similar performance rankings that meet a predefined similarity matching rule. For example, in this instance, to mitigate resource waste, the selection process would consider mixing closely ranked interconnection topologies, starting with the highest ranked interconnection topology (if no cost difference or budget constrains) or from lower ranked topologies (e.g., if there are user-specified budget limits). In some embodiments, similarly ranked connection topologies would be considered to be pairs of connection topologies in adjacent rows in the data tables of FIGS. 5A and 5B.

Consider the following example where it is assumed that there is no cost difference for the various interconnection topologies. Assume that the followings two candidate sets of N GPU devices (N=16) have been identified to provision 16 GPU devices:

Set 1: Server 1 (GPU0~GPU7)+Server 2 (GPU0~GPU3)+ Server 4 (GPU0~GPU3)

Set 2: Server 2 (GPU0~GPU3)+Server 4 (GPU0~GPU3)+ Server 8 (GPU0~GPU3)+Server9 (GPU0~GPU3)

Assume further that the intra-node connection topology for the candidate GPU devices in the associated servers is as shown in the following Table:

TABLE 2

| CONNECTION TYPE | SERVER/GPUs |
|---|---|
| NVLINK | Server1 (GPU0~GPU7) |
| PIX | NONE |
| PXB | Server 2 (GPU0~GPU3), Server 4 (GPU0~GPU3) |
| PHB | Server 8 (GPU0~GPU3), Server 9 (GPU0~GPU3) |
| SOC | NONE |

According to the above rules, the second candidate set (Set 2) would be selected (in block 604) as the optimal set of GPU devices to provision for the service request as the intra-node connection topology rankings are more closely matched. In particular, based on the rank scores shown in FIG. 5A, the intra-node connection topologies for the GPU devices of Servers 2, 4, 8, and 9 are closely matched (e.g., FIG. 5A, PXB with rank score=4, and PHB with rank score=3). On the other hand, the first candidate set (Set 1) of GPU devices would include GPU devices on Server 1 with NVLink connection topologies (e.g., rank score=10, FIG. 5A) and GPU devices on servers 2 and 4 with a multiple internal PCIe switch (PXB) connection topology (e.g., rank score=4, FIG. 5A), which are not closely matched, and which are not "neighbors" (as there exists an intervening ranking (e.g., 5) for a single PCIe switch (PIX) connection topology between them. As such, provisioning of the candidate Set 1 of GPUs would eventually perform at the lower "PCIe-M" level of the GPUs on Servers 2 and 4, thereby wasting the high-performance achievable through the NVLink connection topologies of the GPUs on Server 1.

For multiple GPU server allocations, the evaluation process (block 604) can also take into consideration the rank scores of different inter-node network connection topologies, as shown in FIG. 5B. For example, for inter-node communication between computing resources on different GPU server nodes, it would be a more optimal selection of GPU servers having intra-node and inter-node connection topologies that are the same or closely ranked in terms of performance. For example, it would be a waste of resources to utilize GPU devices on a given GPU server node with high performance intra-node and inter-node connection topologies (e.g., NVLink, 40 GbE intra-node connection topologies, and 100 GbE inter-node connection topology) in conjunction with GPU services on one or more other GPU server nodes with non-matched, lower performance intra-node and inter-node connection topologies.

Referring back to FIG. 6, the evaluation process (block 604) results in an output list of GPU devices (606) which specify an optimal set of GPU devices (and associated server nodes) to provision for the service request. For example, the output list of selected GPU devices (606) may be as follows: {Server 2: GPU0~3, Server 4: GPU0~3, Server 8: GPU0~3, Server 9: GPU0~3}, which represents the selected candidate set (Set 2) of GPU devices as discussed above.

Next, the control server node will access the resource usage database 148 and evaluate the selected GPU devices (606) using current resource usage information in the resource usage database to determine an optimal communication order for the selected GPU devices (block 608). By way of specific example, for a distributed DL training job, the control server node can utilize the current resource usage information to determine an optimal ring communication configuration for the selected set of GPU devices to implement all-reduce operations for the distributed DL training process (e.g., Ring AllReduce protocol). With this process, the logical ordering of the GPU devices would be determined to optimally utilize the bus/networking bidirectional communication capability of the selected GPU devices.

For example, the resource usage database 148 could be queried to check the current bandwidth usage for each communication link direction of the connection topology associated with the GPU devices and select the link directions which are relatively idler to avoid communication bottleneck and overload on the communication link in one directional. As another example, the resource usage database 148 may track a currently running AllReduce (and order) communication ring, wherein for load balancing purposes, one or more of the GPUs in the current ring can be utilized in a different communication order.

Once the communication order is determined (in block 608), the selected GPU devices are provisioned in specified communication order to begin executing the workload associated with the service request (block 610). A data record is added to the resource usage database 148 to provide information regarding the set of GPU devices that were provisioned for the given service request and their communication order (block 612). During execution of the workload, the current bandwidth usage of the communication links between the provisioned GPU devices can be periodically tracked (e.g., every 5 seconds) to determine if there is possible communication overload or bottleneck, and then possibly modify the logical communication order of the GPU devices to optimize the communication, if needed (block 614). Upon completion of the provisioned job, the GPU resources are reclaimed, and the associated data record is removed from the resource usage database 148 (block 616).

Figure 7:
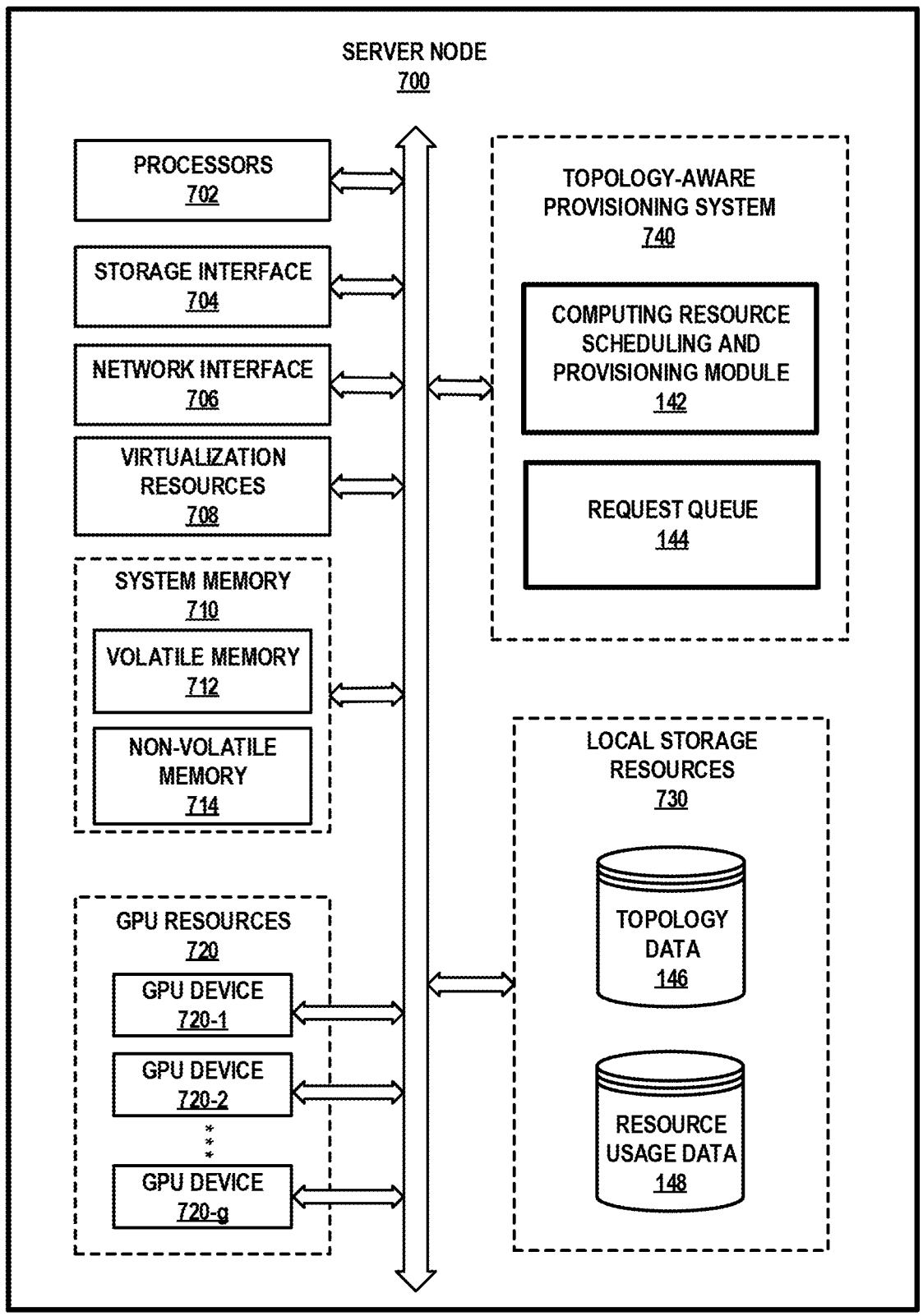
FIG. 7 schematically illustrates an embodiment of a control server node of the computing service platform of FIG. 1, according to an embodiment of the invention.

While FIG. 1 generically illustrates a service control node (e.g., service controller 140), which is responsible for controlling and managing GPU resource provisioning operations as discussed herein, the service control node can be a control system that is hosted by a GPU server node within the GPU cluster 160 of FIG. 1. For example, FIG. 7 schematically illustrates a GPU server node 700 which comprises hardware processors 702, storage interface circuitry 704, network interface circuitry 706, virtualization resources 708, system memory 710, GPU resources 720, local storage resources 730, and a topology-aware provisioning system 740. The system memory 710 comprises volatile memory 712 and non-volatile memory 714. The GPU resources 720 comprise one or more GPU devices 720-1, 720-2, . . . , 720-g. The local storage resources 730 may comprise one or more of a hard disk drive (HDD), solid state drive (SSD) storage devices, etc.

In one embodiment, the topology-aware provisioning system 740 comprises the computing resource scheduling and provisioning module 142 and request queue 144, which are part of the service controller 140 as shown in FIG. 1. The topology-aware provisioning system 740 implements functions to perform the various resource scheduling and provisioning functions as discussed herein. As further shown in FIG. 7, the topology database 146 and resource usage database 148 can be maintained in the local storage resources 730 of the server node 700. In one embodiment, the constituent components of the topology-aware provisioning system 740 comprise software modules that are persistently stored in the local storage resources 730 and loaded into the system memory 710 resources (e.g., volatile memory 712 and/or non-volatile memory 714), and executed by the processors 702 to perform respective functions as described herein. In this regard, the system memory 710 resources, local storage resources 730, and other memory or storage media as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

The processors 702 may comprise one or more processors that are configured to process program instructions and data to execute a native operating system (OS) and applications that run on the GPU server node 700. For example, the processors 702 may comprise one or more central processing units (CPUs), a microprocessor, a microcontroller, an application-specific integrated circuit (ASIC), a field programmable gate array (FPGA), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, GPUs, digital signal processors (DSPs), system-on-chip (SoC), application-specific integrated circuits (ASICs), and field programmable gate array (FPGAs), and other types of specialized processors or coprocessors that are configured to execute one or more fixed functions. The term "hardware accelerator" broadly refers to any hardware that performs "hardware acceleration" to perform certain functions faster and more efficient than is possible for executing such functions in software running on a more general-purpose processor.

The storage interface circuitry 704 enables the processors 702 to interface and communicate with the system memory 710, local storage resources 730, and other local storage and off-infrastructure storage media, using one or more standard communication and/or storage control protocols to read data from or write data to volatile and non-volatile memory/storage devices. The network interface circuitry 706 enables the GPU server node 700 to interface and communicate with a network and other system components. The network interface circuitry 706 comprises network controllers such as network cards and resources (e.g., network interface cards, I/O adaptors, converged Ethernet adaptors, etc.) to support communication protocols and interfaces including, but not limited to, PCIe, direct memory access (DMA) and RDMA data transfer protocols, etc.

The virtualization resources 708 can be instantiated to execute one or more applications or functions which are hosted by the GPU server node 700. For example, the virtualization resources 708 can be configured to implement the various modules and functionalities of the topology-aware provisioning system 740. In one embodiment, the virtualization resources 708 comprise virtual machines that are implemented using a hypervisor platform which executes on the GPU server node 700, wherein one or more virtual machines can be instantiated to execute functions of the GPU server node 700. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. A hypervisor is an example of what is more generally referred to as "virtualization infrastructure." The hypervisor runs on physical infrastructure, e.g., CPUs and/or storage devices, of the GPU server node 700, and emulates the CPUs, memory, hard disk, network and other hardware resources of a host system, enabling multiple virtual machines to share the resources. The hypervisor can emulate multiple virtual hardware platforms that are isolated from each other, allowing virtual machines to run, e.g., Linux and Windows Server operating systems on the same underlying physical host. An example of a commercially available hypervisor platform that may be used to implement one or more of the virtual machines in one or more embodiments of the invention is the VMware® vSphere™ which may have an associated virtual infrastructure management system such as the VMware® vCenter™. The underlying physical infrastructure may comprise one or more commercially available distributed processing platforms which are suitable for the target application.

In another embodiment, the virtualization resources 708 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the GPU server node 700. In yet another embodiment, containers may be used in combination with other virtualization infrastructure such as virtual machines implemented using a hypervisor, wherein Docker containers or other types of LXCs are configured to run on virtual machines in a multi-tenant environment.

The system memory 710 comprises electronic storage media such as random-access memory (RAM), read-only memory (ROM), or other types of memory, in any combination. The term "memory" or "system memory" as used herein refers to volatile and/or non-volatile memory which is utilized to store application program instructions that are read and processed by the processors 702 to execute a native operating system and one or more applications hosted by the GPU server node 700, and to temporarily store data that is utilized and/or generated by the native OS and application programs running on the GPU server node 700. For example, the volatile memory 712 of the system memory 710 may be a dynamic random-access memory (e.g., DRAM) or other forms of volatile random-access memory. The non-volatile memory 714 may comprise a storage-class memory (SCM) that is accessible as a memory resource. For example, the non-volatile memory 714 may be a NAND Flash storage device, a SSD (solid state drive) storage device, or other types of next generation non-volatile memory (NGNVM) devices.

It is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
receiving, by a control server node, a service request from a client system to perform a data processing job in a server cluster managed by the control server node;
determining, by the control server node, a set of candidate accelerator devices that resides in one or more server nodes of the server cluster, which can be utilized to perform the data processing job;
determining, by the control server node, connection topologies between respective pairs of accelerator devices within the set of candidate accelerator devices, and a performance ranking of each connection topology, wherein a given connection topology between a given pair of accelerator devices comprises information regarding a type of interconnect path between the given pair of accelerator devices, and wherein the performance ranking of the given connection topology comprises a rank score that is accorded to the given connection topology among a plurality of different rank scores that are accorded to respective different connection topologies;
utilizing, by the control server node, the determined performance ranking of each connection topology to select a group of accelerator devices among the set of candidate accelerator devices, which can be provisioned to perform the data processing job, wherein the selected group of accelerator devices includes one or more pairs of accelerator devices with connection topologies that have matching performance rankings; and
configuring, by the control server node, the selected group of accelerator devices having the connection topologies with matching performance rankings to execute the data processing job.

2. The method of claim 1, wherein the service request comprises one or more resource demands, and wherein determining the set of candidate accelerator devices comprises determining the set of candidate accelerator devices which satisfy the one or more resource demands.

3. The method of claim 2, wherein the one or more resource demands comprise one of (i) a requested number of accelerator devices to be provisioned for the data processing job and (ii) a type of accelerator device to be provisioned for the data processing job.

4. The method of claim 1, wherein the selected group of accelerator devices includes candidate accelerator devices with a same connection topology.

5. The method of claim 1, wherein the selected group of accelerator devices includes candidate accelerator devices with a same highest performance ranking.

6. The method of claim 1, wherein the selected group of accelerator devices includes candidate accelerator devices with different connection topologies, wherein the different connection topologies have similar performance rankings which meet a predefined similarity matching rule.

7. The method of claim 1, further comprising determining, by the control server node, a communication sequence of the selected group of accelerator devices for configuring the selected group of accelerator devices in a logical communication ring.

8. The method of claim 7, wherein the selected group of accelerator devices is configured in the logical communication ring and provisioned to perform a distributed deep learning model training job using a Ring AllReduce protocol.

9. The method of claim 7, wherein determining the communication sequence comprises:
determining a current bandwidth usage of communication buses to which the selected group of accelerator devices is connected; and
determining the communication sequence of the selected group of accelerator devices based on the determined bandwidth usage to optimize usage of the communication buses.

10. An article of manufacture comprising a processor-readable storage medium having stored therein program code of one or more software programs, wherein the program code is executable by a processor to implement a process comprising:
receiving, by a control server node, a service request from a client system to perform a data processing job in a server cluster managed by the control server node;
determining, by the control server node, a set of candidate accelerator devices that resides in one or more server nodes of the server cluster, which can be utilized to perform the data processing job;

determining, by the control server node, connection topologies between respective pairs of accelerator devices within the set of candidate accelerator devices, and a performance ranking of each connection topology, wherein a given connection topology between a given pair of accelerator devices comprises information regarding a type of interconnect path between the given pair of accelerator devices, and wherein the performance ranking of the given connection topology comprises a rank score that is accorded to the given connection topology among a plurality of different rank scores that are accorded to respective different connection topologies;

utilizing, by the control server node, the determined performance ranking of each connection topology to select a group of accelerator devices among the set of candidate accelerator devices, which can be provisioned to perform the data processing job, wherein the selected group of accelerator devices includes one or more pairs of accelerator devices with connection topologies that have matching performance rankings; and configuring, by the control server node, the selected group of accelerator devices having the connection topologies with matching performance rankings to execute the data processing job.

11. The article of manufacture of claim 10, wherein the service request comprises one or more resource demands, wherein the one or more resource demands comprise one of (i) a requested number of accelerator devices to be provisioned for the data processing job and (ii) a type of accelerator device to be provisioned for the data processing job, and wherein determining the set of candidate accelerator devices comprises determining the set of candidate accelerator devices which satisfy the one or more resource demands.

12. The article of manufacture of claim 10, wherein the selected group of accelerator devices includes candidate accelerator devices with a same connection topology.

13. The article of manufacture of claim 10, wherein the selected group of accelerator devices includes candidate accelerator devices with a same highest performance ranking.

14. The article of manufacture of claim 10, wherein the selected group of accelerator devices includes candidate accelerator devices with different connection topologies, wherein the different connection topologies have similar performance rankings which meet a predetermined similarity matching rule.

15. The article of manufacture of claim 10, further comprising executable program code for determining, by the control server node, a communication sequence of the selected group of accelerator devices for configuring the selected group of accelerator devices in a logical communication ring.

16. The article of manufacture of claim 15, wherein the selected group of accelerator devices is configured in the logical communication ring and provisioned to perform a distributed deep learning model training job using a Ring AllReduce protocol.

17. The article of manufacture of claim 15, wherein determining the communication sequence comprises:

determining a current bandwidth usage of communication buses to which the selected group of accelerator devices is connected; and determining the communication sequence of the selected group of accelerator devices based on the determined bandwidth usage to optimize usage of the communication buses.

18. A system, comprising:

a server cluster comprising a plurality of server nodes, wherein the server nodes comprise accelerator devices;

a control server node comprising a memory to store program instructions, and a processor to execute the stored program instructions to cause the control server node to perform a process which comprises:

receiving a service request from a client system to perform a data processing job in a server cluster managed by the control server node;

determining a set of candidate accelerator devices that resides in one or more server nodes of the server cluster, which can be utilized to perform the data processing job;

determining connection topologies between respective pairs of accelerator devices within the set of candidate accelerator devices, and a performance ranking of each connection topology, wherein a given connection topology between a given pair of accelerator devices comprises information regarding a type of interconnect path between the given pair of accelerator devices, and wherein the performance ranking of the given connection topology comprises a rank score that is accorded to the given connection topology among a plurality of different rank scores that are accorded to respective different connection topologies;

utilizing the determined performance ranking of each connection topology to select a group of accelerator devices among the set of candidate accelerator devices, which can be provisioned to perform the data processing job, wherein the selected group of accelerator devices includes one or more pairs of accelerator devices with connection topologies that have matching performance rankings; and configuring the selected group of accelerator devices having the connection topologies with matching performance rankings to execute the data processing job.

19. The system of claim 18, wherein the selected group of accelerator devices includes candidate accelerator devices with one of (i) a same highest performance ranking, and (ii) different connection topologies, wherein the different connection topologies have similar performance rankings which meet a predetermined similarity matching rule.

20. The system of claim 18, wherein the process performed by the control server node further comprises:

determining a communication sequence of the selected group of accelerator devices for configuring the selected group of accelerator devices in a logical communication ring, wherein the selected group of accelerator devices is configured in the logical communication ring and provisioned to perform a distributed deep learning model training job using a Ring AllReduce protocol;

wherein determining the communication sequence comprises determining a current bandwidth usage of communication buses to which the selected group of accelerator devices is connected, and determining the communication sequence of the selected group of accelerator devices based on the determined bandwidth usage to optimize usage of the communication buses.

* * * * *